(12) United States Patent
Stutz et al.

(10) Patent No.: US 9,301,635 B2
(45) Date of Patent: Apr. 5, 2016

(54) METHOD OF PRODUCING A DRINK, AND DRINKS-PREPARING DEVICE FOR IMPLEMENTING THE METHOD

(75) Inventors: Dieter Stutz, Bussnang (CH); Daniel Fischer, Romanshorn (CH); Marcel W. Hüppi, Rorschacherberg (CH)

(73) Assignee: EUGSTER/FRISMAG, Amriswil (CH)

( * ) Notice: Subject to any disclaimer, the term of this patent is extended or adjusted under 35 U.S.C. 154(b) by 0 days.

(21) Appl. No.: 12/736,700

(22) PCT Filed: Mar. 31, 2009

(86) PCT No.: PCT/EP2009/002357
§ 371 (c)(1),
(2), (4) Date: Oct. 29, 2010

(87) PCT Pub. No.: WO2009/132742
PCT Pub. Date: Nov. 5, 2009

(65) Prior Publication Data
US 2011/0045152 A1 Feb. 24, 2011

(30) Foreign Application Priority Data
Apr. 30, 2008 (DE) .......................... 10 2008 021 777

(51) Int. Cl.
*A47J 31/44* (2006.01)
*A23F 5/00* (2006.01)
*A47J 31/00* (2006.01)
*A47J 31/36* (2006.01)
*A47J 31/50* (2006.01)

(52) U.S. Cl.
CPC ............ *A47J 31/002* (2013.01); *A47J 31/3604* (2013.01); *A47J 31/50* (2013.01)

(58) Field of Classification Search
CPC ...... A47J 31/002; A47J 31/50; A47J 31/3604
USPC ........ 99/290, 323.2, 323.3, 309; 141/82, 104; 222/129.4, 146.1; 426/433
See application file for complete search history.

(56) References Cited

U.S. PATENT DOCUMENTS

| | | | | |
|---|---|---|---|---|
| 4,649,809 | A * | 3/1987 | Kanezashi | 99/290 |
| 5,724,883 | A * | 3/1998 | Usherovich | 99/290 |
| 6,460,735 | B1 * | 10/2002 | Greenwald et al. | 222/146.1 |
| 7,353,751 | B2 | 4/2008 | Takizawa | |
| 2003/0190563 | A1 * | 10/2003 | Nagasawa et al. | 430/569 |

FOREIGN PATENT DOCUMENTS

| | | |
|---|---|---|
| AT | 304 794 | 1/1973 |
| DE | 1 730 508 | 9/1956 |

(Continued)

*Primary Examiner* — Jianying Atkisson
(74) *Attorney, Agent, or Firm* — DLA Piper LLP (US)

(57) ABSTRACT

According to a method of producing a drink, a cold drink, in particular iced coffee is produced from a hot drink, in particular a coffee/espresso, which is produced in a drinks machine by means of a hot-drinks-preparing device (2-6). In order for optionally the hot drink or the cold drink to be produced in portions with a high taste quality, as are typical for catering and domestic use, in the case of the cold drink desired the latter is produced on a continuous basis directly after the hot drink has been prepared, without the direct addition of cooling agents, in particular ice, iced water or cooling bodies, in the same drinks machine using a cooling device (16, 23, 23', 37, 39).

21 Claims, 5 Drawing Sheets

(56) References Cited

FOREIGN PATENT DOCUMENTS

| | | |
|---|---|---|
| DE | 295 19 635 | 4/1996 |
| DE | 10 2004 063 278 | 7/2006 |
| DE | 10 2006 008 341 | 7/2007 |
| DE | 20 2007 008 815 | 1/2008 |
| DE | 20 2006 014 317 U | 3/2008 |
| EP | 0 060 645 | 9/1982 |
| EP | 0 509 505 | 10/1992 |
| EP | 2 025 270 | 2/2009 |
| GB | 2 163 727 A | 3/1986 |
| JP | 52-5776 A | 1/1977 |
| JP | 54-82298 A | 6/1979 |
| JP | 61-56616 A | 3/1986 |
| JP | 62-179689 A | 11/1987 |
| JP | 62-179689 (U) | 11/1987 |
| JP | 1-131983 A | 9/1989 |
| JP | 4-92615 A | 3/1992 |
| JP | 6-105747 A | 4/1994 |
| JP | 2004-140202 A | 5/2004 |
| JP | 2007-202943 A | 8/2007 |
| JP | 2008-119282 A | 5/2008 |
| JP | 3143319 B | 7/2008 |
| JP | 3143319 (U) | 7/2008 |
| WO | WO 2004/089173 | 10/2004 |

* cited by examiner

METHOD OF PRODUCING A DRINK, AND DRINKS-PREPARING DEVICE FOR IMPLEMENTING THE METHOD

The present invention relates to a method for preparing a drink.

A further aspect of the invention relates to a drinks-preparing device suited for implementing the method and comprising a hot-drinks-preparing device, particularly for coffee or espresso preparation.

Both for the preparation of hot drinks the temperature of which is above ambient temperature, particularly coffee/espresso, and for the preparation of cold drinks, methods and devices have, per se, been known which are not, however, suited to produce, as a product for consumption, selectively at will, a hot drink with a high taste quality or, by cooling down the same, a cold drink by means of one and the same hot-drinks-preparing device and this in amounts or portions as are typical for catering or domestic use.

As a cold drink, it is particularly iced coffee which is contemplated, but also cooled water, so-called cold water. If necessary, the cooled water is to be used to prepare a drink from an instant powder.

In general, under a cold or iced drink, a drink should be understood which has in any case a temperature below ambient temperature, preferably below 15° C., preferably in particular between 5° C. and 8° C.

Under the term hot drink as used in the present text, hot water, too, should be understood as is particularly used for the preparation of tea or processing food and stimulant instant powders, also of food combinations for preparing soups or the like.

The common well-known hot-drinks-preparing devices which typically incorporate a hot water generator include coffee/espresso preparing devices or machines substantially comprising a brewing unit, a water heater and a water pump for feeding the water heater, the water pump being connected with a water container which, as a water source, has fresh water available.

Under the term water source as used in the present text, there should be understood, in addition to such a water container, a water duct as installed in a building.

If coffee from a usual coffee/espresso preparing device is to be further treated to become iced coffee, a long-winded elaborate cooling process of the hot coffee is required as a rule, that is, it is not possible to prepare iced coffee straight away from the freshly brewed coffee. Typically, the hot drink, particularly coffee/espresso, is stored prior to and/or during the course of the cooling down in a vessel in order to let a cooling agent, particularly ice, iced water or cooling elements, react on the hot drink until its temperature has gone down to conform with consumption needs. By extended dwelling times of the hot drink, for instance prior to the cooling process or during the course of the cooling process, the taste of the cold drink produced might be impaired.

In order to strive for a simple rapid cooling down of the drink the starting temperature of which should be up to 30° C., that is, which is not a typical hot drink, a continuous-flow cooling device has already been known which comprises a thermally insulated container to receive a cooling agent such as ice, iced water, tap water, refrigerating brine, and a cooling coil of heat conductive material disposed in the cooling agent through which the drink to be cooled down should flow with moderate speed (DE 1 730 508 U). For cooling down hot drinks, such as freshly prepared coffee or espresso, particularly in larger amounts as required in restaurants, however, this continuous-flow cooling device is not well suited because, inter alia, the cooling agent which should take up the heat from the drink has first to be filled into the thermally insulated container and then, during use, can hardly release the heat taken up from the thermally insulated container so that the cooling effect will diminish, particularly if no larger cooling agent amounts have been provided.

It is, therefore, an object of the present invention to produce hot drinks or cold drinks each of high taste quality in drinks amounts or portions as typical for catering or domestic use, rapidly and efficiently having the temperature desired for consumption, while avoiding the disadvantages of prior art drinks preparing or production methods. Such versatile methods should be performed by means of little elaborate devices.

This object is met by a method with the features or method steps of a first embodiment of the present invention. Accordingly, in a first method step, a hot drink is prepared by means of a prior art hot-drinks-preparing device in a way known insofar, after which the hot drink, if so desired, can be consumed as such or, if otherwise desired, a cold drink is produced in that the hot drink is continuously cooled down, in a second method step subsequent to the first method step, to cold drinks temperature by means of a cooling device substantially without a direct addition of cooling agents, particularly ice, iced water or cooling bodies. Due to the direct sequence of the two method steps and the continuous cooling process, a high taste quality cold drink is guaranteed. The direct sequence is realized in that the cold drink is continuously produced by the cooling device through which the hot drink to be cooled is flowing, without storing the hot drink in a vessel. The cooling device may be equipped with an active cooling aggregate such as a compressor or an absorber or a Peltier element arrangement or, less unlimited, with a passive cold storage device.

The method steps according to the first embodiment are implemented, space-saving, with short fluid paths in one single drinks machine, i.e. within one housing which incorporates both the hot-drink-preparing device and the cooling device.

In a flexibly configurable variant according to a second embodiment, the second method step which succeeds the first method step executed in the hot-drinks-preparing device, can also uninterruptedly continuously be performed in an in-feed device by its cooling device which in-feed device is connected with the hot-drinks-preparing device.

The respective suited method according to the invention for the selective alternative production of either a hot drink or a cold drink can, in the case in which a hot drink as the final product or consumption product is desired, simply so be set according to a third embodiment that the hot drink prepared in the hot drinks preparing device is dispensed by the drinks machine, while the cooling device is deactivated or the fluid circumvents the cooling device.

As an additional advantageous process measure for obtaining the desired final temperature of the cold drink, cooled water from the water source can be admixed, according to a fourth embodiment, to the cooled-down hot drink downstream of the cooling device. For this purpose, a small cooling capacity of the cooling device is sufficient so that it may be designed particularly compact with tight channels.

Also for decreasing the cooling capacity of the cooling device serves the process measure according to a fifth embodiment in that, upstream of the cooling device, water from the water source is admixed to the hot drink. By means of the admixed water which is fresh water, furthermore, the cooling device is advantageously cleaned. The water to be admixed as above is also referred to as admixing water.

The method of the invention suited for the selective production of a hot drink or a cold drink can for the alternative production of a cold drink be simply set according to a sixth embodiment so that the cold drink, particularly cold water, is dispensed by the drinks machine while the fluid circumvents the hot-drinks-preparing device or the latter device is at least partly deactivated.

A compact drinks-preparing-device suitable for executing the method according to the first embodiment is realized by one single drinks machine in only one housing in which the required fluid connections are short. Via the hot drinks duct of this drinks machine, a hot drink can continuously be fed into the cooling device. Further advantages of this drinks machine result from the method of the first embodiment.

A flexibly usable module-like assembly of the drinks-preparing device for executing the method according to the second embodiment is defined in an eighth embodiment. This assembly simplifies the setting-up of the complete drinks machine the basic component whereof, the hot-drinks-preparing device, can also function without an in-feed device, if necessary, i.e. it can dispense a hot drink, and for a future alternatively desired cold drinks preparation can be supplemented with the in-fed device which, via the hot drinks duct, is connected, fluid-conductively and, optimally, also control-technologically, with the basic component.

As for the rest, for implementing the method according to the third embodiment, namely for the alternative production of a hot drink as a consumption product, the cooling device according to a ninth embodiment is so designed that it can be deactivated or, flow-wise, be circumvented.

For implementing the method according to the sixth embodiment, namely for the alternative production of cooled cold water as a consumption product or as a pre-step of a cold drink further to be produced, the hot-drinks-preparing device according to a twelfth embodiment can, flow-wise, be circumvented or, at least partly, be deactivated.

In detail, the hot-drinks-preparation device can, according to a thirteenth embodiment, preferably be circumvented, flow-wise, by means of an admixing water duct which is connected with the water source. This flow path can suitably be activated, according to a fourteenth embodiment, by an admixing water pump arranged in the admixing water duct.

According to a tenth embodiment, an admixing water duct can be connected, flow-wise, for the implementation of the method according to the fourth embodiment, with one outflow of the cooling device.

To this end, this admixing water duct may lead, particularly via a valve arrangement, to a third flow channel arrangement of the first heat exchanger which is connected with the outflow of the cooling device, particularly of a cold/drinks outflow duct.

(If a cold drinks outflow duct is arranged in such a way that it can alternatively also dispense a hot drink, it will be referred to in the present text as cold/drink outflow duct.)

For realizing the method variant according to the fifth embodiment, the design of the drinks machine according to an eleventh embodiment is provided according to which the admixing water duct which is connected with the water source, may be connected with an entrance of the cooling device, particularly of a heat exchanger entrance duct.

According to a fifteenth embodiment, a suitable cooling device used in the drinks machine comprises at least one first heat exchanger, which includes at least one first flow channel arrangement for the continuous passage of a drink to be cooled down, or of a hot drink, particularly espresso, which is connected at the outflow side with the cold/drink outflow of the drinks machine, and a cooling aggregate heat-conductively connected with the heat exchanger, In order to reach cooling down of the hot drink to the desired temperature of particularly below 10° C. by only one passage through the heat exchanger, water or admixing water from the admixing water duct which is connected with the water source, particularly a water container, can be admixed, according to the tenth embodiment, downstream of the first heat exchanger or, according to the eleventh embodiment, upstream of the first heat exchanger, to the drink to be cooled down. In the first-mentioned case of admixing the cooled admixing water at the outflow of the first heat exchanger, the admixture may be implemented via the admixture water duct which is fed by the water source, and the flow-wise subsequent third flow channel arrangement of the first heat exchanger.

In both of the above variants of feeding the admixing water to the drink to be cooled down, the amount of heat to be carried off by the cooling unit is reduced. By the addition of admixing water to the hot drink, a mixture temperature results. Therefore, the cooling unit has to cool down the drink for only the temperature difference between the mixture temperature and the final temperature of the cold drink. In this way, so-called iced coffee which should have a temperature of below 10° C. can be produced even in larger quantities. The alteration of the composition of the cold drink relative to the hot drink by the admixture of the admixing water is relatively small and can, taste-wise, substantially be compensated in that the hot drink is produced for instance as espresso concentrate so that after the admixture of the admixing water the cold drink may have the strength of an average iced coffee.

A coffee/espresso preparing device can serve, according to a sixteeneth embodiment, for the coffee/espresso preparation as hot drink, which coffee/espresso preparing device comprises a brewing unit, a water heater, particularly continuous-flow heater, and a water pump which can be connected with a water source, particularly a water container for fresh water, which is typically provided for the coffee/espresso preparation.

However, with the water container, there can suitably also be connected the above-referenced admixing water duct for feeding cold water for a cold drink or of admixing water for mixing with a hot drink to be cooled down.

The water heater of such a coffee/espresso preparing device can also be used for hot water generation as a pre-step for a different hot drink.

For a rapid selective change-over of the drink preparing device from hot drinks dispensing to cold drink dispensing and vice versa, a valve arrangement may be provided according to a seventeenth embodiment, for instance a multi-path valve, at the outlet of the hot-drinks-preparing device, particularly the brewing unit, in order to connect it via the valve arrangement directly with a hot drink outlet of the drinks-preparing device, below which for instance an espresso collection vessel, or a plurality thereof, may be placed or, alternatively, with the inflow of the cooling device, particularly of the first flow channel arrangement of the first heat exchanger. In the latter case, the hot drink, for instance coffee, may flow from the outlet of the hot-drinks-preparing device into the first flow channel arrangement of the first heat exchanger and subsequently as cold drink via the cold drink outflow of the drinks-preparing device for instance into an iced coffee collecting vessel.

Instead of a particular hot drink outflow and a cold drink outflow, a (cold) drink outflow duct as defined further above may serve for selective drink dispensing as well.

In the amplified embodiment according to an eighteenth embodiment, the valve arrangement can also be disposed, as mentioned before, between the admixing water duct connected with the water source and the inflow of the cooling device, or the first flow channel arrangement of the first heat exchanger and/or the cold/drink outflow duct in order to admix admixing water to the hot drink either before or after cooling down in the first heat exchanger.

For a rapid selective activation of the above function and of further functions of the drinks-preparing device, the valve arrangement is provided, according to a nineteenth embodiment, with inflows for hot water, hot drink and admixing water as well as with outflows for the drink to be cooled down, or the cold drink thereby generated, admixing water and hot drink. Connections between these inflows and outflows can be adjusted to be easily operable by a control unit pre-programmable corresponding to the kinds of drinks or the modes of preparation desired. In addition, the control unit is suitably used for activating, or deactivating, special function units of the drinks preparing device, particularly the hot-drinks-preparing device thereof, such as a coffee/espresso preparing device, and, if necessary, individual components, such as pumps, water heaters etc. The valve arrangement can be simplified, or extensively be substituted by extensive activating, or deactivating, of the function units and components.

In order to prepare for instance, alternatively, cold water and to dispense it from the drinks outflow, particularly the cold drinks outflow duct, of the drinks machine, the control unit can so be designed that, in case of switched-off hot-drinks-preparing device, the cooling device, particularly the cooling aggregate of the first heat exchanger, is fed by the admixing water duct, to which end the admixing water pump might be switched on.

Furthermore, according to a thirty-third embodiment, the control unit can suitably be so designed that it can be switched, by the cooling aggregate of the first heat exchanger to a stand-by mode wherein the cooling agent of the cooling aggregate is pre-cooled in a cooling agent cycle duct. Thereby, a waiting period to reach a temperature provided for cooling the first flow channel arrangement in the first heat exchanger is reduced, or avoided.

To the first heat exchanger can belong, according to a twenty-second embodiment, a second flow channel arrangement which is a good heat-conductive connection with the first flow channel arrangement, and is arranged in a cooling agent cycle with a cooling aggregate, which is a compression cooling aggregate, or an absorptions cooling aggregate. In this connection and particularly advantageously, an evaporator of the cooling aggregate according to a twenty-third embodiment can directly be constituted by the second flow channel arrangement of the first heat exchanger whereby a high efficiency is obtained.

According to the twenty-third embodiment, a third flow channel arrangement which is in a good heat-conductive connection with the first flow channel arrangement, or in certain cases, with the second flow channel arrangement can belong to the first heat exchanger. Thereby, the admixing water is cooled down before it is admixed to the cooled-down hot drink or, alternatively, is dispensed as cold water.

A condenser belonging furthermore to the compressions aggregate or absorption cooling aggregate can, according to a twenty-seventh embodiment, be of a convection-cooled type or can be force-cooled.

It is particularly useful to integrate the condenser, according to a twenty-eighth embodiment, in a second heat exchanger which comprises in addition to the flow channel arrangement of the condenser a further flow channel arrangement which is disposed in a continuous flow supply line feeding the continuous flow heater of the coffee/espresso preparing device or the hot drinks preparing device. In this way, the heat of condensation is used for pre-heating the water for the hot drinks preparation, i.e. espresso or coffee preparation.

Instead of a compression cooling aggregate or absorption cooling aggregate arranged in a cooling agent cycle or circuit, a Peltier element arrangement can be provided. The Peltier element arrangement, at least one Peltier element having the advantages as known per se, is simply in heat conductively connected, according to a twenty-ninth embodiment, with a flow channel arrangement of the first heat exchanger for passing the drink to be cooled down, or the drinks/cold water mixture, or the cold water, i.e. at its Peltier cold side.

For cooling the Peltier warm side of the Peltier element arrangement and for better energy exploitation, the Peltier warm side of the Peltier element arrangement can, according to a thirtieth embodiment, be in good heat conductive connection with a flow channel arrangement of a second heat exchanger, i.e. a heater exchanger unit, by the flow channel arrangement of which the water is fed into the hot-drinks-preparing device, or the continuous flow heater. In this way, one block together with the Peltier element arrangement constitutes in this case a double heat exchanger, namely on the Peltier cold side for cooling the cold drink and on the Peltier warm side for pre-warming the brewing water in the continuous flow heater supply line.

If the hot drink prepared in the hot-drinks-preparing device is to be cooled down to a cold drink, heat can also directly be withdrawn from the hot drink, that is, without cooling aggregate or Peltier element arrangement, and be used, heat-energy saving, for pre-heating the fresh water which is being fed into the hot-drinks-preparing device for subsequent hot drink preparation. To this end, the heat withdrawn from the hot drink is fed back to this water, or fresh water, by means of a further heat exchanger. In the case of a coffee/espresso preparing device as a hot-drinks-preparing device, this heat exchanger is arranged, according to a thirty-first embodiment, with a first flow channel arrangement in the continuous flow heater supply line to the continuous flow heater and is arranged, with a second flow channel arrangement, in the hot drinks duct at the outflow of the coffee/espresso preparing device. This further heat exchanger constitutes the third heat exchanger if in the continuous flow heater, a flow channel arrangement of the second heat exchanger as referred to further above is arranged as well which obtains waste heat from the cooling device or from the first heat exchanger. In the latter case, the first flow channel arrangement of the third heat exchanger is disposed downstream of the flow channel arrangement of the second heat exchanger in the continuous flow heater supply line so that in both heat exchangers a temperature gradient relative to the continuous flow heater supply line is guaranteed. In a case where the hot drink, particularly coffee or espresso, is not to be cooled down, this second flow channel arrangement is blocked by means of a valve, or is bridged. This valve, too, may constitute a part of the valve arrangement referred to further above. By means of the third heat exchanger, the first and the second heat exchangers and the cooling aggregate, or the Peltier element arrangement, are relieved and can be smaller dimensioned.

According to a thirty-second embodiment, the flow channel arrangements of the heat exchangers referred to are particularly advantageously designed in micro structure technology. In this way, the heat exchanger can be implemented in a compact way in that, in the variant with two or three flow channel arrangements, they all can be pressure and liquid tightly arranged in geometrically and thermally close contact relative to each other. The two flow channel arrangements can be arranged in any way, preferably at right angles or in parallel relative to each other.

In order to increase the reliability of the cooling means of the drinks preparing device, particularly if it includes at least one first heat exchanger having a flow channel arrangement for the hot drink to be cooled down, a particle filter is disposed, according to a twentieth embodiment in order to avoid clogging, for instance with coffee grounds remnants, between the outflow of the hot-drinks-preparing device and the cooling device, particularly of the flow channel arrangement referred to of the first heat exchanger. According to a twenty-first embodiment the particle filter may preferably be rinsed by means of a cross flow rinsing duct during each hot drink preparation, particularly espresso preparation, or by means of a particular rinsing program.

In the following the invention will be described based on a drawing comprising 7 figures from which further details and features may result. In the drawings, FIG. 3A is an alternative third embodiment of the drinks-preparing device diagrammatically shown.

In the drawing, corresponding parts of the embodiments have been provided with identical reference numerals.

In all embodiments and as shown in connection with the first, second, third, sixth and seventh embodiments of the drinks-preparing device in FIGS. 1 to 3, 6 and 7, a water container 1 is provided in which water is stored which in the following will also be referred to as fresh water. In the first embodiment according to FIG. 1, the water container 1 provided with a particle filter is connected at its outflow, via a water duct 2 and a water pump 3 arranged within it, directly with a continuous flow hater 4 as water heater which may supply brewing water to a brewing unit for an espresso brew to be produced.

All embodiments of the drinks-preparing device comprise furthermore a first heat exchanger 16, or 37, for the preparation of a cold drink or an iced coffee from the espresso brewed in brewing unit 7 or of cold water without the admixture of espresso. To this end, the first heat exchanger 16 of the first embodiment of the drinks-preparing device is in connection with a cooling aggregate generally referred to as 23 so that the heat exchanger 16 is cooled. The cooling aggregate 23 of the first embodiment of the drinks preparing device, and of the second embodiment where the cooling aggregate is referred to as 23', may be a compression cooling aggregate or an absorption cooling aggregate, an essential constituent of which, namely a mechanical or thermal compressor, is referred to as 24. To the cooling aggregate 23, or 23', there belongs also an evaporator which is formed, in the first heat exchanger 16 of the first and of the second embodiment of the drinks-preparing device by a second flow channel arrangement 27 of the first heat exchanger 16.

Figure 1:
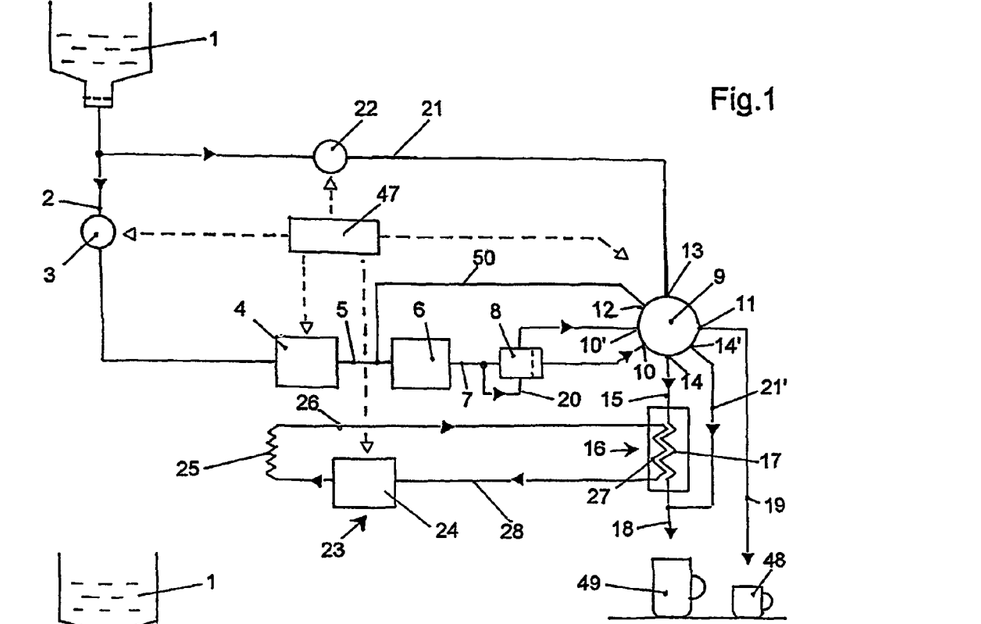
FIG. 1 is a first embodiment of the drinks-preparing device diagrammatically shown.

In the first embodiment of the drinks-preparing device according to FIG. 1, the cooling aggregate 23 includes furthermore a convection cooled condenser 25 as well as cooling agent cycle duct sections 26, 28 which together with the compressor/generator 24 and the evaporator 27 for a cooling cycle (circuit) within which a cooling agent circulates.

Figure 2:
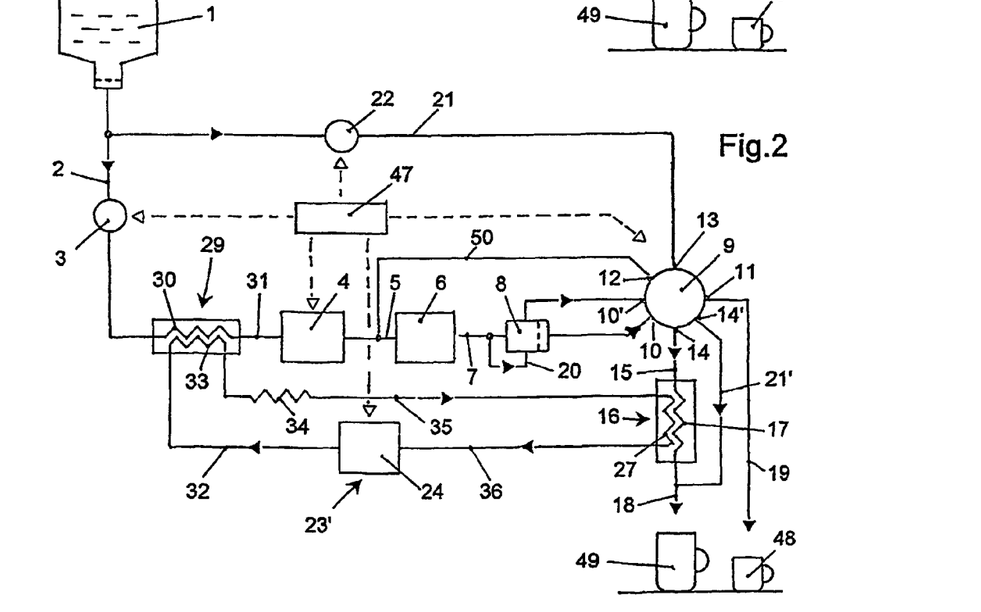
FIG. 2 is a second embodiment of the drinks-preparing device diagrammatically shown.

The embodiment of the drinks-preparing device shown in FIG. 2 differs from the first embodiment according to FIG. 1 in the mode of cooling of the condenser 33 of the cooling aggregate 23' the condenser 33 of which constitutes part of a second heat exchanger 23 which includes a flow channel arrangement 30 through which water fed from the water duct 2 flows and in this way pre-heats, by using the waste heat of the condenser 33, the brewing water fed to the continuous flow heater 4 via a continuous flow heater supply line 36. By means of the second heat exchanger, therefore, both cooling of the condenser 33 and pre-heating of the brewing water for the continuous flow heater 4 in the continuous flow heater supply line 31 are obtained. In the cooling cycle (circuit) in which a cooling agent circulates, in this case the compressor/generator 24 of the cooling aggregate 23', the condenser 33 in the second heat exchanger 29, an external condenser 34, the evaporator 27 and connecting cooling agent cycle sections 32, 35, 36 are arranged. The external condenser 34 is required because in the condenser 33 in the second heat exchanger 29 only part of the cooling agent is condensed. The external condenser 34 thus guarantees a complete release of the heat amount of the cooling agent.

Figure 3:
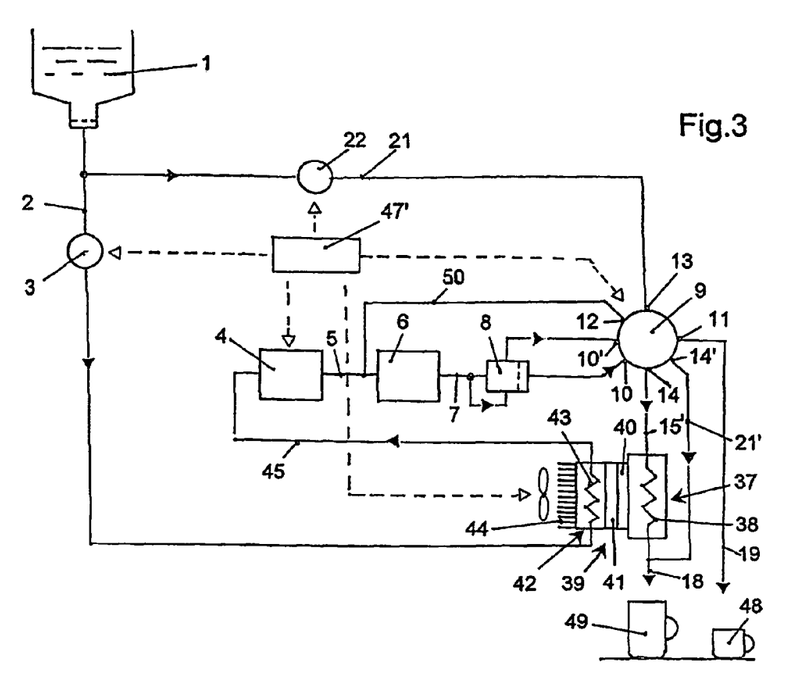
FIG. 3 is a third embodiment of the drinks-preparing device diagrammatically shown.

In a third embodiment of the drinks-preparing device as shown in FIG. 3, cooling of a first heat exchanger 37 is implemented by means of a Peltier element arrangement 39. The preparation of the espresso and the addition of the admixing water is performed in the same way as when using a compression or absorption cooling aggregate. This embodiment differs, therefore, from the first and the second embodiment by the Peltier element arrangement 39 consisting of one or a plurality of Peltier elements, the Peltier cold side whereof is in good heat-conductive contact with the first heat exchanger 37 which is cooled by the Peltier element arrangement 39. The first heat exchanger 37 of this embodiment is provided with only one flow channel arrangement 38 through which the drink to be cooled down flows. The Peltier warm side 41 of the Peltier element arrangement 39 may be cooled by means of convection or, as shown in FIG. 3, by means of a flanged-on second heat exchanger 42 which is provided with a flow channel arrangement 43 through which water fed from the water duct 2 flows and, in this way, pre-heats the passing water by means of the waste heat of the Peltier element arrangement 39 feeding it, via a continuous flow heater supply line 45, to the water heater 4. In the last-mentioned case, the Peltier element arrangement 39 is, therefore, as described already, part of a double heat exchanger arrangement 37, 42, namely on the cold side for cooling down the hot drink, or espresso, and on the warm side for heat deduction and for pre-heating the brewing water.

A control unit 47' for the selective operation of the third embodiment of the drinks-preparing device according to FIG. 3 for the most different kinds of drinks differs from a control unit 47 of the first and second embodiment of the drinks preparing device in that the control unit 47' switches on or off the Peltier element arrangement rather than the compressor or absorber cooling aggregates.

The first through the fourth and the sixth and the sevenths embodiments of the drinks-preparing device comprise, furthermore, a valve arrangement 9 the inflow 10 of which for the hot drink may be fed, via a hot drink duct 7 or 7' and a particle filter 8, from the brewing unit 6 with the hot drink or the espresso brew. A further inflow 10' might be connected with the outflow side of a by-pass duct, not designated, of the particle filter 8 optionally provided.

In order to substantially promote the versatility of the drinks-preparing device, a further inflow 12 of the valve arrangement is provided for the connection of a hot water duct 50 which is branched off from the hot water duct 5 at the outflow of the continuous flow heater 4.

A further inflow 13 of the valve arrangement 9 is connected, via an admixing water duct 21 and an admixing water pump 22 arranged therein, with the water container 1.

Furthermore, the valve arrangement 9 shows various outflows which, depending on the valve adjustment, selectively dispense different fluids, particularly drinks.

From an outflow 11, a hot drink outflow duct 19 is branched off from which particularly espresso brew, or espresso, or hot water only, can flow into a collection vessel 48.

From a further outflow 14' of the valve arrangement 9, an admixing water duct to a third flow channel arrangement 17' of the first heat exchanger 16 is branched off which may be connected to the outflow of the first flow chamber arrangement 17 of the first heat exchanger 16; or the admixing water duct from the outflow 14' leads, in the third embodiment, to a further flow channel arrangement 38' of the first heat exchanger 37 which may be connected to the outflow of the flow channel arrangement 38 of the first heat exchanger 37.

A further outflow 14 of the valve arrangement 9 which is provided in each embodiment is connected with an inflow of the first flow channel arrangement 17 at the heat exchanger inflow duct 15 or is connected, in the third embodiment, with an inflow of the flow channel arrangement 38 at the heat exchanger inflow duct 15'.

The valve duct 9 may be controlled by a programmable electrical control unit 47, or 47', which also switches on and off, via electrical connections, the electrically operated water pump 3, the electrically operated admixing water pump 22, the continuous flow heater 4 and the cooling aggregate 23, or 23', or the Peltier element arrangement, depending on the kind of drink.

The above-described embodiments of the drinks-preparing device function as follows:

For preparing an espresso as a consumption produce in the first embodiment, the control unit 47 switches the water pump 3 on for passing the water from the water container 1, and the water pump 3 passes the water via the water duct 2 and to the continuous flow heater 4. In the latter, the water is heated to brewing temperature and subsequently passed on, via a hot water duct 5 into the brewing unit 6 for brewing the espresso. After the brewing process, the espresso brew is passed, via the hot drinks duct 7 and the particle filter 8 into the inflow 10 for hot drinks of the valve arrangement 9. Depending on the controlled adjustment of the valve arrangement, the espresso brew arrives at the outflow 11 of the valve arrangement 9 and further on via the hot drinks outflow duct 19 into the hot drinks collection vessel 48. In addition, a partial flow of the espresso brew may flow via the by-pass duct 20 branched off from the hot drinks duct 7 and the particle filter 8 from a—not designated—particle filter rinsing duct outflow into the inflow 10' of the valve arrangement 9, and through it also to the outflow 11 of the valve arrangement, from which it flows off, also via the hot drinks outflow duct 19, into the hot drinks collection vessel 48.

During the course of the passage through the particle filter 8, this partial flow of the espresso brew, therefore, automatically rinses the particle filter.

The preparation of an espresso in the second embodiment of the drinks-preparing devices differs from the first embodiment in that the water, before it enters via the continuous flow heater supply line 31 into the continuous flow heater 4, flows through the second heat exchanger 29 which transfers the waste heat of the cooling aggregate 23' to the water, thereby heating it.

If hot water only is to be dispensed from the drinks-preparing device in order to prepare for instance tea or soup in the hot drinks collection vessel, hot water generated in the water heater 4 is passed via the hot water duct 5 directly via the hot water duct 50 branched off from it, that is, not via the brewing unit 6, to the inflow 12 of the valve unit 9 set by control for hot water dispensing to its outflow 11 for hot drinks and flows from it via the hot drinks outflow duct 19 into the hot drinks collection vessel 48. This function may be set, or performed, in all embodiments except for the fifth embodiment by the valve arrangement 9.

In order to prepare an iced coffee using a compression or absorption cooling aggregate 23, or 23', the control unit 47 first switches the cooling aggregate 23, or 23' and the continuous flow heater 4 on, and only when the cooling aggregate 23, or 23', i.e. the evaporator 27 of the cooling aggregate 23, or 23' forming the second flow channel arrangement 27 of the first heat exchanger 16, and the continuous flow heater 4 have obtained their operating temperatures, the control unit 47 switches the water pump 3 on for drawing water from the water container 1 for espresso preparation. The water pump 3 conveys the water via the water duct 2, as shown in FIG. 1, in the case of the first embodiment of the drinks-preparing device, directly into the continuous flow heater 4, and in case of the second embodiment, as shown in FIG. 2, via a second heat exchanger 29 which releases the waste heat of the cooling aggregate 23' to the water thereby pre-heating it, to the continuous flow heater 4. In the latter, the water is heated to brewing temperature and subsequently passed, via the how water duct 5, into the brewing unit 6. The espresso brew obtained in the brewing process is again passed via the hot drinks duct 7 and the particle filter 7 into the inflow 10 of the valve arrangement 9. Simultaneously with the start of the espresso preparing process, the control unit 47 switches the admixing water pump 22 on for drawing water from the water container 1, which in this case is conveyed as admixing water via the admixing water duct 21 to the inflow 23 of the valve arrangement 9. In the sort-of-beverage position "Iced Coffee", controlled by the control unit 47 of the valve arrangement 9, the latter connects the inflow 13 as well as the inflow 10 with the outflow 14 of the valve arrangement 9. In this way, both the hot espresso brew and the admixing water are passed at the same time to the second outflow 14 of the connected heat exchanger inflow duct 15, from which the espresso-admixed water mixture flows into a first flow channel arrangement 17 of the first heat exchanger 16 and via the cold drinks outflow duct 18 into a cold drinks collection vessel 49. During the course of the passage of the espresso-admixed water mixture through the first heat exchanger 16, the mixture is cooled down to the desired temperature.

To this end, a second flow channel arrangement 27 of the first heat exchanger forms, as mentioned above, the evaporator of a cooling cycle. The cooling of the condenser 25 of the cooling aggregate 23 is implemented either by means of convection cooling, as shown in FIG. 1, or the condenser 33 constitutes, as shown in FIG. 2, part of a second heat exchanger 29 which is disposed between the water duct 2 and the continuous flow heater supply line 31 to the water heater 4. In the latter case, the water cools the condenser 33 of the second heat exchanger 29, and the waste heat is used as pre-heating for the brewing water.

In order to avoid a waiting time till reaching the operating temperature of the cooling aggregate 23, or 23', it might be useful to operate the cooling aggregate 23, or 23', in a stand-by mode at reduced power.

When using a Peltier element arrangement 39 for cooling the first heat exchanger, as shown in FIG. 3, preparation of the espresso and the feeding of the cold admixing water is performed in the same way as when using a compression or absorption cooling aggregate. In this third embodiment, the first heat exchanger 37 is provided with only one flow path arrangement 38 into which, in the "Iced Coffee" position of the valve arrangement 9 controlled by the control unit 47', the espresso and the admixing water flow in through the heat exchanger inflow duct 15'. The cooling of this liquid mixture is in this case obtained during the course of the passage by means of the Peltier cold side 40 of the Peltier element arrangement 39 which is good heat conductively flanged to the first heat exchanger 37. The cold drink obtained by cooling down flows from the cold drinks outflow duct 18 into the cold drinks collection vessel 49.

The waste heat of the Peltier element arrangement 39 is carried off in that the water drawn from the water container 1 by means of the water pump 3 flows through the flow channel arrangement 43 of the second heat exchanger 42 which is flanged to the Peltier warm side 41 of the Peltier element arrangement 39, absorbing the waste heat of the Peltier element arrangement 39, and enters via the continuous flow heater supply line 45 into the continuous flow heater 4. Additionally, or alternatively, waste heat may be deducted by forced convection by means of a cooling body 44 including a blower.

In this embodiment, too, the control unit 47' switches first the continuous flow heater 4 and/or the Peltier element arrangement 39 on, when producing a drink, and when they have obtained their operating temperature, the water pump 3 and, if necessary, the admixing water pump 22 is switched on.

In addition to the preparation of espresso and iced coffee, the drinks-preparing device in all its embodiments offers the possibility to prepare only cold water as a cold drink. In this case, the control unit 47, or 47', activates only the valve arrangement 9, the cooling aggregate 23, or 23', or the Peltier element arrangement 39 and the admixing water pump 22. The cold water conveyed thereupon from the admixing water pump 22 via the admixing water duct 21 into the second inflow 13 of the valve arrangement 9 flows via the valve arrangement 9 from its outflow 14 via the heat exchanger inflow duct 15, or 15', into the first flow channel arrangement 17 of the first heat exchanger 16, or the flow channel arrangement 38 of the first heat exchanger 37, is being cooled down during the course of the passage and flows, via the cold drinks outflow duct 18 into the cold drinks collection vessel 49. Since in case of cold water preparation a second heat exchanger 29, or 42 for absorbing the waste heat of the cooling aggregate 23', or the Peltier element arrangement 39, is not effective since no water for brewing water preparation is passed through, the waste heat of the cooling aggregate is dissipated by means of the condenser 25 in FIG. 1, or of the Peltier warm side 41 of the Peltier element arrangement 39 by means of the cooling body 44.

Figure 4:
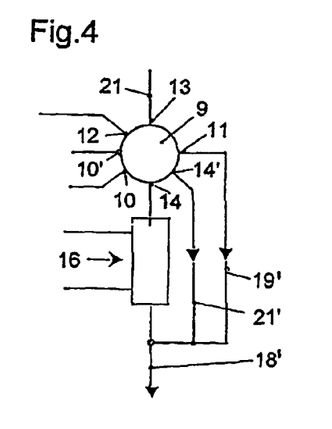
FIG. 4 is a section of a fourth embodiment, shown diagrammatically.

In the fourth embodiment of the drinks-preparing device according to FIG. 4, as different from the first three embodiments, no hot drinks outflow duct 19 completely separated from the cold drinks outflow duct 18 is provided as shown in FIGS. 1, 2, 3; the hot drinks outflow duct 19', as shown in FIG. 4, is rather connected with the (cold) drinks outflow duct 18' of the first heat exchanger to constitute a common drinks outflow. In the same way can be dealt with the hot drinks outflow duct 19 of the third embodiment by connecting it with the cold drinks outflow duct 18. In the fourth embodiment according to FIG. 4, in this way, the hot drink is dispensed at the same location as the cold drink by the common (cold) drinks outflow duct 18'.

Figure 5:
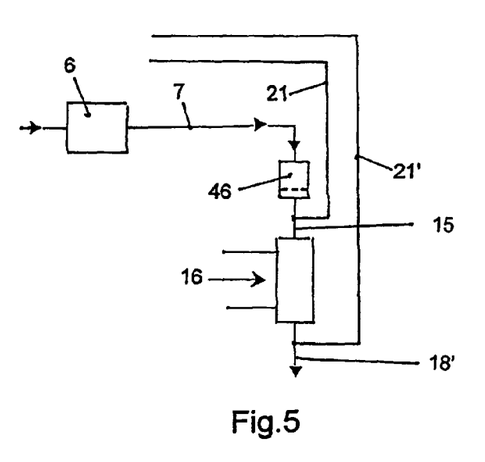
FIG. 5 is a section of a fifth embodiment, shown diagrammatically.

FIG. 5 shows, in a partial view, two possibilities of selectively preparing without a valve arrangement, a hot drink, particularly an espresso, or a cold drink, or providing cold water. In this case, too, it is only the (cold) drinks outflow duct 18' which is provided as a common drinks outflow at the outflow of the first heat exchanger 16 in place of which the first heat exchanger 37 of the Peltier element arrangement 39 would function as well.

In the case of the fifth embodiment, the hot drinks duct 7, particularly an espresso duct and the admixing water duct 21, are constantly connected with the inflow duct 15, or 15', of the first heat exchanger 16, or 37. The control of the kind of the drink is realized in this case for the preparation of an espresso only by activating the brewing unit 6 connected with the water heater, not shown, or, for the preparation of an iced coffee both by activating the brewing unit 6 and the first heat exchanger 16, or 37, and if necessary for admixing cold admixing water, the admixing water duct 21, particularly by the admixing water pump, not shown in FIG. 5, or for the preparation of cold water only by activating the admixing water pump 21 and the first heat exchanger 16, or 37.

As an alternative, the admixing water duct 21' may be connected with the third flow channel arrangement 17' of the heat exchanger 16, or with the further flow channel arrangement 38' of the heat exchanger 37. This has the advantage that when preparing cold water, the admixed water is cooled down in the separate flow channel arrangement 17', or 38', and does not flow through the flow channel arrangement 17, or 38, soiled by espresso brew.

Figure 6:
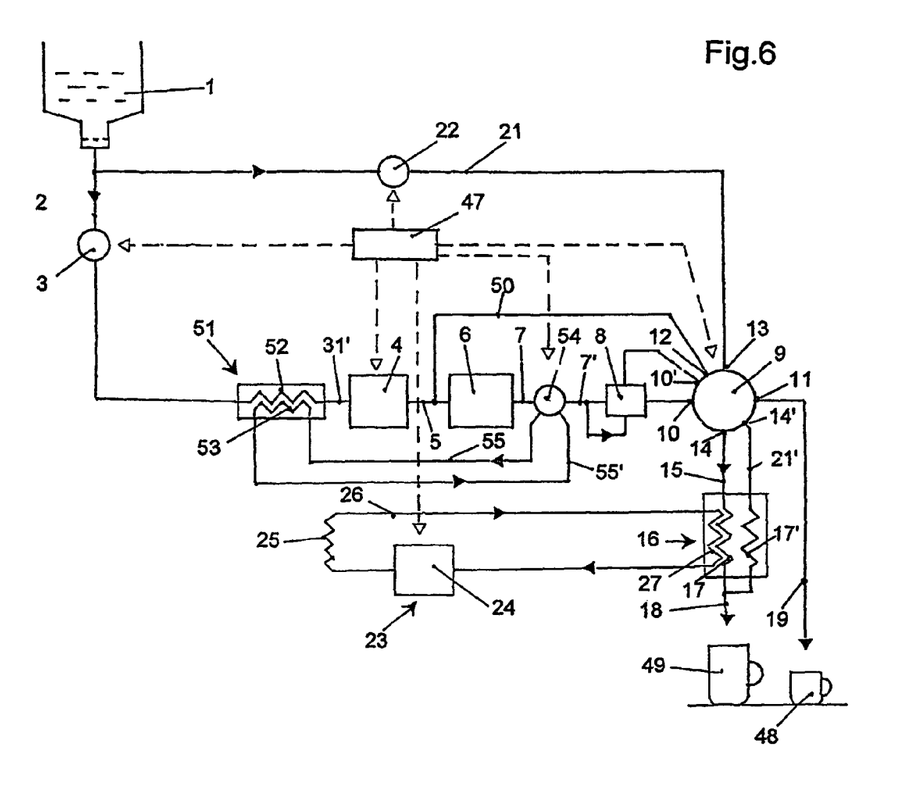
FIG. 6 is a sixth embodiment of the drinks-preparing device by which the first embodiment has been further developed.

Otherwise, also in the variants according to FIG. 5, the cooling of the first heat exchanger 16, or 37, and the heat dissipation of the cooling aggregate, or of the Peltier element arrangement, is realized as in the case of the embodiments according to FIGS. 1 to 3, or if required, to FIG. 5 or 6.

Also in the variants having no valve arrangement, it is useful to provide a particle filter 46, as can be taken from FIG. 5, to avoid clogging of the first flow channel arrangement of the first heat exchanger 16, or the flow channel arrangement of the first heat exchanger 37 of the Peltier element arrangement 39.

In both variants of the fifth embodiment of the drinks-preparing device according to FIG. 5, the hot drink selectively to be dispensed as such by the (cold) drinks outflow duct 18', particularly espresso brew, flows through the first heat exchanger 16 which, however, is not activated in this case. The selection of the different kinds of drink is made here by means of a control unit which activates the above-referenced components of the drinks-preparing device to which end the control unit may be designed similar to what has been described in connection with the control unit 47, 47', but need not be suited to set a valve arrangement as a control.

The sixth embodiment of the drinks-preparing device according to FIG. 6 differs from the first embodiment according to FIG. 1 described further above by a further heat exchanger 51 in addition to the heat exchanger 16 cooled by the cooling aggregate 23. This further heat exchanger is inserted, with its first flow channel arrangement 52, in the continuous flow heater supply line 31 and, with its second flow channel arrangement 53, via a valve 54 controlled by the control unit 56, a two-way valve, into the hot drinks duct 7, 7' at the outflow of the brewing unit 6. In practice, the valve 54 is suitably part of the expanded valve arrangement 9 as well.

In this drink-preparing device, if in the hot-drinks-preparing device thereof, in the present case the coffee/espresso preparing device, a prepared hot drink, or hot coffee or espresso, has to be cooled down to constitute a cold drink ready to be dispensed, the hot coffee/espresso is first passed via the valve 54 through the further heat exchanger 51 in which a considerable part of the heat content is dissipated to the cold water in the water duct 2 which, so pre-heated, is fed via the continuous flow heater supply line 31' into the continuous flow heater 4. In the first heat exchanger 16, solely the further cooling down of the drink to the desired temperature of the cold drink or iced coffee which is dispensed by the cold drinks outflow duct 18 takes place.

On the other hand, if a desired hot drink according to controlled adjustment of the valve 54 is to be dispensed, the heat exchanger 51 is not activated and the hot drinks duct 7 is switched through via the valve 54 and the valve arrangement 9 directly to the hot drinks outflow duct 19.

The seventh embodiment of the drinks-preparing device according to FIG. 7 again differs from the second embodiment according to FIG. 2 which has been described further above, by the further heat exchanger 51 which, in this case, constitutes the third heat exchanger 51 supplementing the first heat exchanger 16 and the second heat exchanger 29. The first flow channel arrangement 52 of the third heat exchanger 51 in the present case follows, flow-wise, the first flow channel arrangement 30 of the second heat exchanger 29 and leads again, via the continuous flow heater supply line 31' to the continuous flow heater 4. The valve 54 in the hot drinks duct 7, 7' at the outflow of the brewing unit 6 is controlled by the control unit 56', as in the case of the sixth embodiment.

Figure 7:
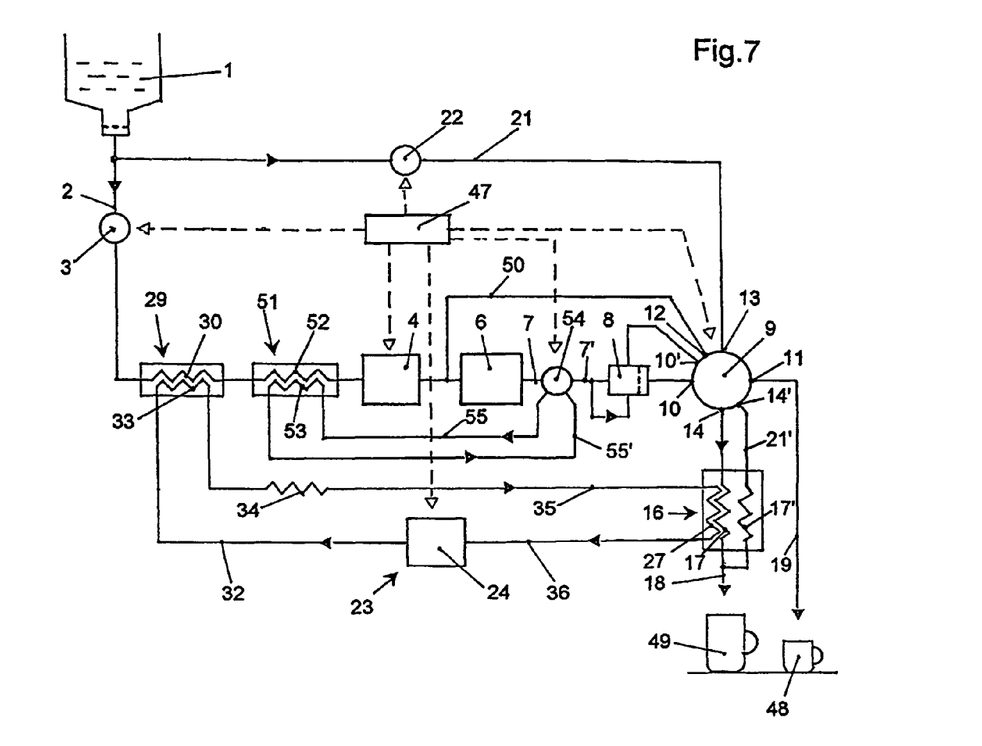
FIG. 7 is a seventh embodiment of the drinks-preparing device by which the second embodiment has been further developed.

Thereby, if a cold drink to be dispensed by the cold drinks outflow duct 18 is desired, the third heat exchanger 51 is looped-in via the controlled valve 54 into the hot drinks duct 7, 7' and may further warm up the water already pre-warmed by means of the second heat exchanger 29 to a higher temperature before it is supplied, via the continuous flow heater supply line 31', to the continuous flow heater 4.

For a desired hot drink to be dispensed, the hot drinks duct 7, 7' is switched through, if necessary via the particle filter 8 and the valve arrangement 9, directly to the hot drinks outflow duct 19, with the heat exchangers 16, 29 deactivated, so that it is cooled by none of the heat exchangers 16, 29, 51.

LIST OF REFERENCE NUMERALS

1 Water container (water source)
2 Water duct
3 Water pump
4 Continuous heater (water heater)
5 Hot water duct
6 Brewing unit
7, 7' Hot drinks duct
8 Particle filter
8' Hot drinks duct
9 Valve arrangement (multi-path valve)
10 Inflow for hot drink
10' Inflow for hot drink (from particle filter)
11 Outflow for hot drink
12 Inflow for hot water
13 Inflow for admixing water
14 Outflow for drink to be cooled down
14' Outflow for admixing water
15, 15' Heat exchanger inflow duct
16 First heat exchanger
17 First flow channel arrangement
17' Third flow channel arrangement
18 Cold drinks outflow duct
18' (Cold) drinks outflow duct
19, 19' Hot drinks outflow duct
20 By-pass duct
21 Admixing water duct
22 Admixing water pump
23, 23' Cooling aggregate
24 Compressor/generator
25 Condenser
26 Cooling agent cycle duct section
27 Evaporator/second flow channel arrangement of the first heat exchanger
28 Cooling agent cycle duct section
29 Second heat exchanger
30 First flow channel arrangement of the second heat exchanger
31, 31' Continuous flow heater supply line
32 Cooling agent cycle duct section
33 Condenser/second flow channel arrangement of the second heat exchanger
34 (external) Heat exchanger
35 Cooling agent cycle duct section
36 Cooling agent cycle duct section
37 First heat exchanger
38 Flow channel arrangement
38' Further flow channel arrangement
39 Peltier element arrangement
40 Peltier cold side
41 Peltier warm side
42 Second heat exchanger
43 Flow channel arrangement
44 Cooling body including blower
45 Continuous flow heater supply line
46 Particle filter
47, 47' Control unit
48 Hot drinks collection vessel
49 Cold drinks collection vessel
50 Hot water duct
51 Further (third) heat exchanger
52 First flow channel arrangement of the further heat exchanger
53 Second flow channel arrangement of the further heat exchanger
54 (Two-way) valve
55 Deducting line
55' Back-flow line
56. 56' Control unit

The invention claimed is:

1. A drinks-preparing device comprising a hot-drinks-preparing device,
wherein said hot-drinks-preparing device is arranged in a drinks machine and is flow-wise connected directly via a hot drinks duct with a cooling device which is accommodated in the same drinks machine,
comprising the hot-drinks preparing device and the cooling device flow-conductively connected with the outflow thereof, including at least one first heat exchanger having at least one first flow channel arrangement for the drink to be cooled,
and wherein a valve arrangement is provided between the outflow of the hot drinks duct from the hot-drinks preparing device and a hot-drinks outflow of a hot drinks outflow duct from the drinks-preparing device and an inflow at a heat exchanger inflow duct of the first flow channel arrangement of the first heat exchanger; and said valve arrangement is a multi-path valve with a closed housing, wherein the multi-path valve comprises an inflow duct for a hot drink, an outflow duct for a hot drink, an outflow duct for a drink to be cooled down connected to the inflow duct of the heat exchange, and an outflow duct for admixing water connected to an outflow duct of the heat exchanger.

2. A drinks-preparing device comprising a hot-drink-preparing device, wherein said hot-drinks-preparing device is arranged in a drinks machine and is fluid-conductively connected via a hot drinks duct with a cooling device arranged in an in-fed device wherein the atmosphere is the atmosphere outside of the drinks-preparing device, comprising the hot-drinks preparing device and the cooling device flow-conductively connected with the outflow thereof, including at least one first heat exchanger having at least one first flow channel arrangement for the drink to be cooled, and wherein a valve arrangement is provided between the outflow of the hot drinks duct from the hot-drinks preparing device and a hot-drinks outflow of a hot drinks outflow duct from the drinks-preparing device and an inflow at a heat exchanger inflow duct of the first flow channel arrangement of the first heat exchanger; and said valve arrangement is a multi-path valve with a closed housing, wherein the multi-path valve comprises an inflow duct for a hot drink, an outflow duct for a hot drink, an outflow duct for a drink to be cooled down connected to the inflow duct of the heat exchanger, and an outflow duct for admixing water connected to an outflow duct of the heat exchanger.

3. The drinks-preparing device according to claim 1 or 2, wherein for the alternative preparation of a hot drink as a consumption produce, said cooling device can either be deactivated or flow-wisely circumvented.

4. The drinks-preparing device according to claim 1 or 2, wherein after passing said cooling device, the cooled-down hot-drink can be fed admixing water.

5. The drinks-preparing device according to claim 1 or 2, wherein an admixing water duct connected with a water source can be flow-wise connected with one inflow of said cooling device, in addition to the hot drinks duct.

6. The drinks-preparing device according to claim 1, wherein for the alternative preparation of a cold drink as consumption produce, said hot-drink-preparing device is flow-wise circumvented or, at least partly, deactivated.

7. The drinks-preparing device according to claim 6, wherein said hot-drinks-preparing device is flow-wise circumvented by means of an admixing water duct connected with a water source.

8. The drinks-preparing device according to claim 7, wherein in said admixing water duct, an admixing water pump is arranged.

9. The drinks-preparing device according to claim 1 or 2, wherein said hot-drink-preparing device is a coffee/espresso preparing device which comprises a brewing unit, a water heater, and a water pump for coffee/espresso preparation connected to a water source.

10. The drinks-preparing device according to claim 1, wherein said valve arrangement, is additionally disposed between said admixing water duct and said inflow of said cooling device, or said first flow channel arrangement of said first heat exchanger and a cold drinks outflow of said drinks-preparing device.

11. The drinks-preparing device according to claim 10, wherein said valve arrangement can be switched over by means of a control unit in such a way that the inflows of said valve arrangement for hot watery), hot drink and admixing water can be connected with outflows of said valve arrangement for the drink to be cooled down, or cold drink, admixing water, and hot drink.

12. The drinks-preparing device according to claim 1, wherein said at least one first heat exchanger including at least one first flow channel arrangement is heat-conductively connected with a Peltier cold side of a Peltier element arrangement as cooling aggregate.

13. The drinks-preparing device according to claim 12, wherein a Peltier warm side of said Peltier element arrangement is heat conductively connected with a flow channel arrangement of a second heat exchanger which is disposed in a continuous flow heater.

14. The drinks-preparing device according to claim 1, wherein said at least one first flow channel arrangement of said heat exchangers is designed in micro structure technology.

15. The drinks-preparing device according to claim 12, wherein said flow channel arrangements of said heat exchangers are designed in micro structure technology.

16. The drinks-preparing device according to claim 13, wherein said flow channel arrangements of said heat exchangers are designed in micro structure technology.

17. The drinks-preparing device according to claim 12, wherein said first heat exchanger includes a further flow channel arrangement which is heat-conductively connected with said first flow channel arrangement.

18. The drinks-preparing device according to claim 17, wherein said flow channel arrangements of said heat exchangers are designed in micro structure technology.

19. The drinks-preparing device according to claim 2, wherein for the alternative preparation of a cold drink, as consumption produce, said hot-drink-preparing device is flow-wise circumvented or, at least partly, deactivated.

20. The drinks-preparing device according to claim 19, wherein said hot drinks-preparing device is flow-wise circumvented by means of an admixing water duct connected with a water source.

21. The drinks-preparing device according to claim 20, wherein in said admixing water duct, an admixing water pump is arranged.

* * * * *